(12) United States Patent
Yaworski et al.

(10) Patent No.: US 8,178,783 B2
(45) Date of Patent: May 15, 2012

(54) SEALANT-FILLED ENCLOSURES AND METHODS FOR ENVIRONMENTALLY PROTECTING A CONNECTION

(75) Inventors: Harry George Yaworski, Apex, NC (US); Jimmy E. Marks, Dunn, NC (US); Mahmoud K. Seraj, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 294 days.

(21) Appl. No.: 12/619,928

(22) Filed: Nov. 17, 2009

(65) Prior Publication Data
US 2010/0124454 A1 May 20, 2010

Related U.S. Application Data

(60) Provisional application No. 61/115,727, filed on Nov. 18, 2008.

(51) Int. Cl.
*H02G 15/113* (2006.01)
(52) U.S. Cl. ........................................... 174/92
(58) Field of Classification Search ............. 174/92
See application file for complete search history.

(56) References Cited

U.S. PATENT DOCUMENTS

| | | |
|---|---|---|
| 3,325,591 A | 6/1967 | Wahl |
| 3,484,541 A | 12/1969 | Campbell |
| 3,715,459 A | 2/1973 | Hoffman |
| 3,879,575 A | 4/1975 | Dobbin et al. |
| 4,451,696 A | 5/1984 | Beinhaur |
| 4,849,580 A | 7/1989 | Reuter |
| 4,859,809 A | 8/1989 | Jervis |
| 4,880,676 A | 11/1989 | Puigcerver et al. |
| 4,909,756 A | 3/1990 | Jervis |
| 5,099,088 A | 3/1992 | Usami et al. |

(Continued)

FOREIGN PATENT DOCUMENTS

JP 2009148010 A 7/2009

(Continued)

OTHER PUBLICATIONS

Notification Concerning Transmittal of International Preliminary Report on Patentability (Chapter I of the Patent Cooperation Treaty) in corresponding PCT Application No. PCT/US2009/064768 mailed Sep. 1, 2011 (12 pages).

(Continued)

*Primary Examiner* — Chau Nguyen
(74) *Attorney, Agent, or Firm* — Myers Bigel Sibley & Sajovec, PA

(57) ABSTRACT

A sealant-filled enclosure for environmentally sealing a connection includes a first cover member and a second cover member. The first cover member defines a first cavity having a first bottom. The second cover member is pivotally connected to the first cover member for movement between an open position and a closed position. The second cover member defines a second cavity having a second bottom. A first sealant is positioned in the first cavity and extends up to a first level relative to the first bottom without a connection disposed in the first cavity. A second sealant is positioned in the second cavity and extends up to a second level relative to the second bottom without a connection disposed in the second cavity. The first and second levels together exceed a height from the first bottom to the second bottom in the closed position. The first and second sealants may be gels.

21 Claims, 16 Drawing Sheets

U.S. PATENT DOCUMENTS

| | | | |
|---|---|---|---|
| 5,129,839 | A | 7/1992 | VanSkiver |
| 5,140,746 | A | 8/1992 | Debbaut |
| 5,347,084 | A | 9/1994 | Roney et al. |
| 5,397,859 | A | 3/1995 | Robertson et al. |
| 5,561,269 | A | 10/1996 | Robertson et al. |
| 5,569,882 | A | 10/1996 | Yokoyama et al. |
| 5,594,210 | A | 1/1997 | Yabe |
| 5,763,835 | A | 6/1998 | Huynh-Ba et al. |
| 5,828,005 | A | 10/1998 | Huynh-Ba et al. |
| 6,169,250 | B1 | 1/2001 | Bolcato |
| 6,265,665 | B1 | 7/2001 | Zahnen |
| 6,333,463 | B1 | 12/2001 | Bukovnik et al. |
| 7,138,580 | B2 | 11/2006 | Boutin |
| 7,141,738 | B2 * | 11/2006 | Marsac et al. ............ 174/92 |
| 7,341,479 | B2 | 3/2008 | Boutin |
| 2005/0167147 | A1 | 8/2005 | Marsac et al. |

FOREIGN PATENT DOCUMENTS

| | | |
|---|---|---|
| WO | WO 00/67354 A1 | 11/2000 |

OTHER PUBLICATIONS

Notification of Transmittal of the International Search Report and the Written Opinion of the International Searching Authority, or the Declaration in corresponding PCT Application No. PCT/US2009/064768 mailed Jun. 1, 2011 (16 pages).

* cited by examiner

SEALANT-FILLED ENCLOSURES AND METHODS FOR ENVIRONMENTALLY PROTECTING A CONNECTION

RELATED APPLICATION(S)

The present application claims the benefit of and priority from U.S. Provisional Patent Application Ser. No. 61/115,727, filed Nov. 18, 2008, the disclosure of which is incorporated herein by reference.

FIELD OF THE INVENTION

The present invention relates to environmentally protective enclosures and, more particularly, to enclosures for environmentally protecting cable connections and the like.

BACKGROUND OF THE INVENTION

Sealant-filled environmentally protective enclosures are employed to protect cable connections. Such enclosures may be used to environmentally protect the connections between telecommunications signal transmission cables, the electrical power transmission cables, etc. For example, U.S. Pat. No. 5,763,835 to Huynh-Ba, et al. discloses a gel-filled enclosure including a pair of cavitied bodies that are hingedly connected and closable in clam shell fashion. When the enclosure is closed about the cables, gel is typically displaced and thereby elongated and seals about a cable splice or the like. However, such enclosures are typically adapted to suitably seal about a limited range of connection/cable sizes. Additionally, for relatively large connections and cables, the force required to close an enclosure about the connection/cables may be unduly large.

SUMMARY OF THE INVENTION

According to some embodiments of the present invention, a sealant-filled enclosure for environmentally sealing a connection includes a first cover member and a second cover member. The first cover member defines a first cavity having a first bottom. The second cover member is pivotally connected to the first cover member for movement between an open position and a closed position. The second cover member defines a second cavity having a second bottom. A first sealant is positioned in the first cavity and extends up to a first level at a first height relative to the first bottom without a connection disposed in the first cavity. A second sealant is positioned in the second cavity and extends up to a second level at a second height relative to the second bottom without a connection disposed in the second cavity. The first and second heights together exceed an enclosure height from the first bottom to the second bottom in the closed position. The first and second sealants may be gels.

According to method embodiments of the invention, a method for environmentally protecting a connection includes providing a sealant-filled enclosure. The enclosure includes a first cover member and a second cover member. The first cover member defines a first cavity having a first bottom. The second cover member is pivotally connected to the first cover member for movement between an open position and a closed position. The second cover member defines a second cavity having a second bottom. A first sealant is positioned in the first cavity and extends up to a first level at a first height relative to the first bottom without a connection disposed in the first cavity. A second sealant is positioned in the second cavity and extends up to a second level at a second height relative to the second bottom without a connection disposed in the second cavity. The first and second heights together exceed an enclosure height from the first bottom to the second bottom in the closed position. The method further includes: inserting a connection assembly between the first and second cover members; and relatively pivoting the second cover member about the first cover member from the open position to the closed position with the connection assembly therebetween. The first and second sealants may be gels.

According to further embodiments of the present invention, a sealant-filled enclosure for environmentally sealing a connection includes a first cover member and a second cover member. The first cover member defines a first cavity having a first cavity volume. The second cover member is pivotally connected to the first cover member for movement between an open position and a closed position. The second cover member defines a second cavity having a second cavity volume. In the closed position, the enclosure defines an enclosure cavity having an enclosure volume. A first sealant is positioned in the first cavity and fills a first sealant volume. A second sealant is positioned in the second cavity and fills a second sealant volume. The first and second sealant volumes together exceed the enclosure volume. The first and second sealants may be gels.

According to further method embodiments of the present invention, a method for environmentally protecting a connection includes providing a sealant-filled enclosure including a first cover member and a second cover member. The first cover member defines a first cavity having a first cavity volume. The second cover member is pivotally connected to the first cover member for movement between an open position and a closed position. The second cover member defines a second cavity having a second cavity volume. In the closed position, the enclosure defines an enclosure cavity having an enclosure volume. A first sealant is positioned in the first cavity and fills a first sealant volume. A second sealant is positioned in the second cavity and fills a second sealant volume. The first and second sealant volumes together exceed the enclosure volume. The method further includes: inserting a connection assembly between the first and second cover members; and relatively pivoting the second cover member about the first cover member from the open position to the closed position with the connection assembly therebetween. The first and second sealants may be gels.

According to further embodiments of the invention, a sealant-filled enclosure for environmentally sealing a connection includes a first cover member and a second cover member. The first cover member defines a first cavity. The second cover member is pivotally connected to the first cover member for movement between an open position and a closed position. The second cover member defines a second cavity. A first sealant is positioned in the first cavity. A second sealant is positioned in the second cavity. The enclosure is configured such that the first sealant will displace the second sealant as the enclosure is closed without a connection disposed in the enclosure. The first and second sealants may be gels.

According to further method embodiments of the present invention, a method for environmentally protecting a connection includes providing a sealant-filled enclosure including a first cover member and second cover member. The first cover member defines a first cavity. The second cover member is pivotally connected to the first cover member for movement between an open position and a closed position. The second cover member defines a second cavity. A first sealant is positioned in the first cavity. A second sealant is positioned in the second cavity. The enclosure is configured such that the first sealant will displace the second sealant as the enclosure is closed without a connection disposed in the enclosure. The method further includes: inserting a connection assembly between the first and second cover members; and relatively pivoting the second cover member about the first cover member from the open position to the closed position with the connection assembly therebetween. The first and second sealants may be gels.

According to further embodiments of the invention, a sealant-filled enclosure for providing an environmental seal about a connection includes a first cover member and a second cover member. The first cover member defines a first cavity and includes at least one interior wall defining a reservoir chamber within the first cavity. The first cover member further defines a sealant chamber in the first cavity outside of the reservoir chamber. The reservoir chamber is adapted to receive a portion of the connection. At least a portion of the reservoir chamber is not filled with sealant. The second cover member defines a second cavity and is pivotally connected to the first cover member for movement between an open position and a closed position. A first sealant is disposed in the sealant chamber of the first cavity. A second sealant is disposed in the second cavity. The first and second sealants may be gels.

According to further method embodiments of the present invention, a method for environmentally protecting a connection includes providing a sealant-filled enclosure. The enclosure includes a first cover member and a second cover member. The first cover member defines a first cavity and includes at least one interior wall defining a reservoir chamber within the first cavity. The first cover member further defines a sealant chamber in the first cavity outside of the reservoir chamber. The reservoir chamber is adapted to receive a portion of the connection. At least a portion of the reservoir chamber is not filled with sealant. The second cover member defines a second cavity and is pivotally connected to the first cover member for movement between an open position and a closed position. A first sealant is disposed in the sealant chamber of the first cavity. A second sealant is disposed in the second cavity. The method further includes: inserting a connection assembly between the first and second cover members; and relatively pivoting the second cover member about the first cover member from the open position to the closed position with the connection assembly therebetween such that, in the closed position, the portion of the connection is disposed within the reservoir chamber. The first and second sealants may be gels.

According to further embodiments of the present invention, an enclosure for environmentally sealing a connection includes a first cover member and a second cover member. The first cover member defines a first cavity and includes a back wall having a recess defined therein. The second cover member is pivotally connected to the first cover member for movement between an open position and a closed position. The second cover member defines a second cavity. A first sealant is positioned in the first cavity. A second sealant is positioned in the second cavity. At least one interior wall defines a reservoir chamber within the first cavity. The reservoir chamber is adapted to receive a portion of the connection. At least a portion of the reservoir chamber is not filled with sealant. The at least one interior wall is joined to the back wall in the recess. The first and second sealants may be gels.

Objects of the present invention will be appreciated by those of ordinary skill in the art from a reading of the figures and the detailed description of the illustrative embodiments which follow, such description being merely illustrative of the present invention.

BRIEF DESCRIPTION OF THE DRAWINGS

The accompanying drawings, which are incorporated in and constitute a part of the specification, illustrate some embodiments of the invention and, together with the description, serve to explain principles of the invention.

DETAILED DESCRIPTION OF EMBODIMENTS OF THE INVENTION

Figure 1:
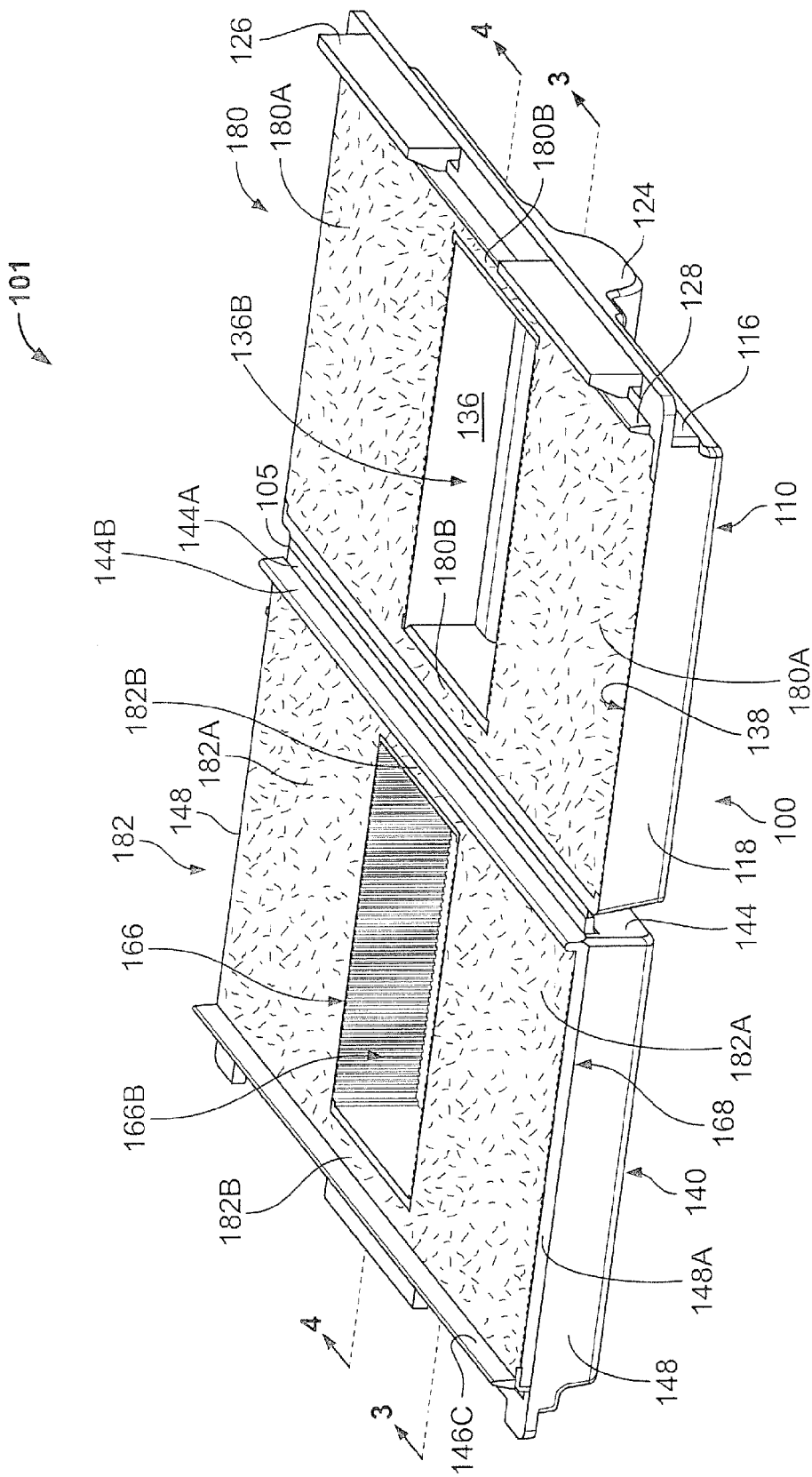
FIG. 1 is a top perspective view of a sealant-filled enclosure according to some embodiments of the present invention, wherein the sealant-filled enclosure is in an open position.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout the description. It will be understood that, as used herein, the term "comprising" or "comprises" is open-ended, and includes one or more stated elements, steps and/or functions without precluding one or more unstated elements, steps and/or functions. As used herein, the term "and/or" includes any and all combinations of one or more of the associated listed items.

Except where noted herein, designations of "first," "second," "third," etc. do not indicate an order or hierarchy of steps or elements.

With reference to FIGS. 1-4 and 7-11, a sealant-filled enclosure 101 according to some embodiments of the present invention is shown therein. The enclosure 101 is adapted to form a sealed enclosure about a connection and/or cables or the like. For example, the enclosure 101 may be used to form an environmentally protective enclosure about a plurality of cables 5 joined by a connector 7 to form a connection assembly 9 as best shown in FIGS. 7-11.

The enclosure 101 includes a housing 100 and masses of sealant 180, 182 disposed therein. According to some embodiments, and as discussed in more detail below, the sealant 180, 182 may be a gel. The housing 100 includes a first shell or cover member 110 and a second shell or cover member 140 joined to one another by a hinge 105 and adapted to move between an open position as shown in FIGS. 1-4 and a closed position as shown in FIGS. 8-11. In the open position, the enclosure 101 can receive the connection assembly 9. In the closed position, the enclosure 101, including the masses of sealant 180, 182, may operate to seal about and environmentally protect the connection assembly 9. The cover members 110, 140 are asymmetric with respect to one another.

Figure 2:
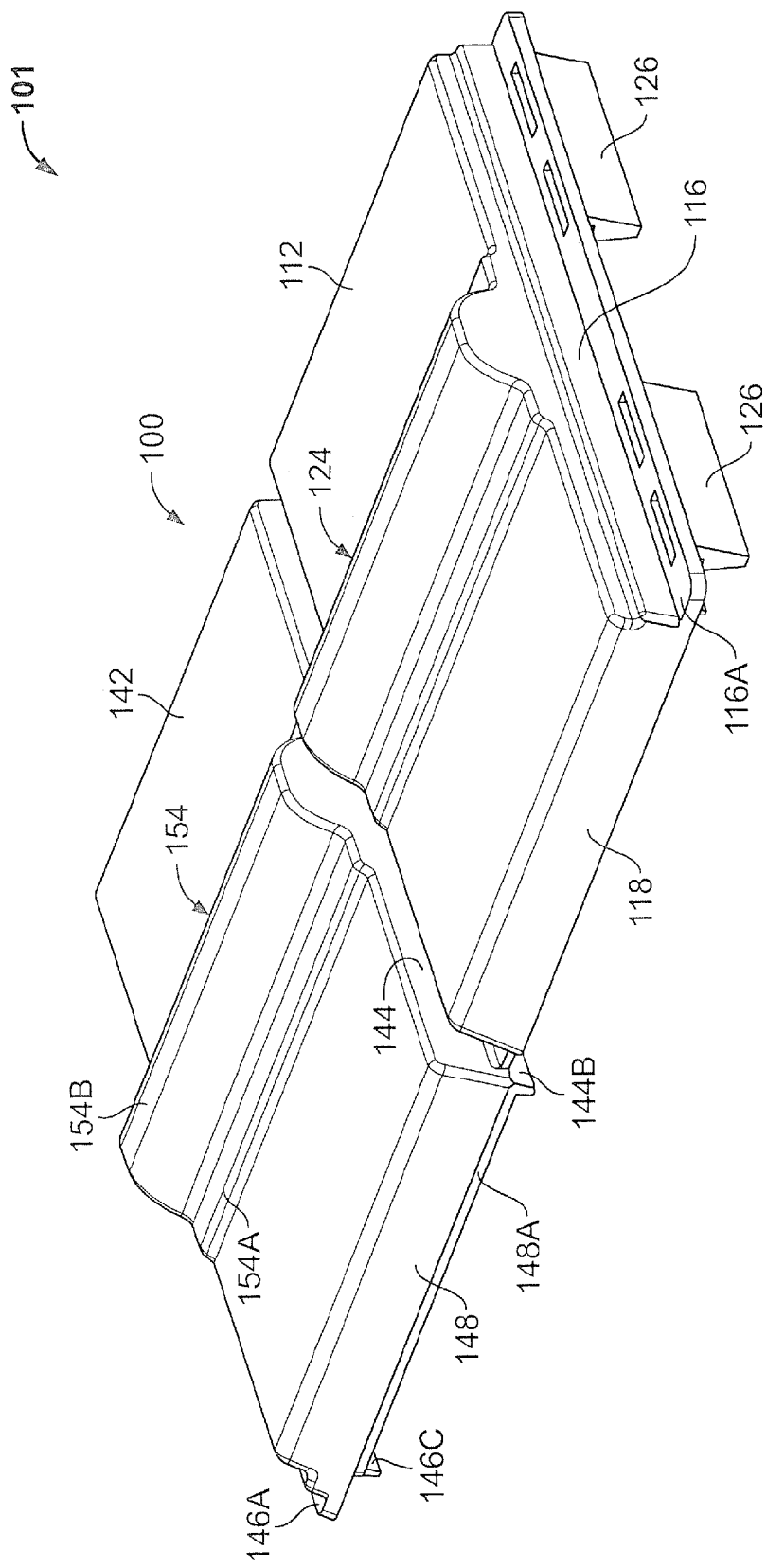
FIG. 2 is a bottom perspective view of the sealant-filled enclosure of FIG. 1, wherein the sealant-filled enclosure is in the open position.
Figure 5:
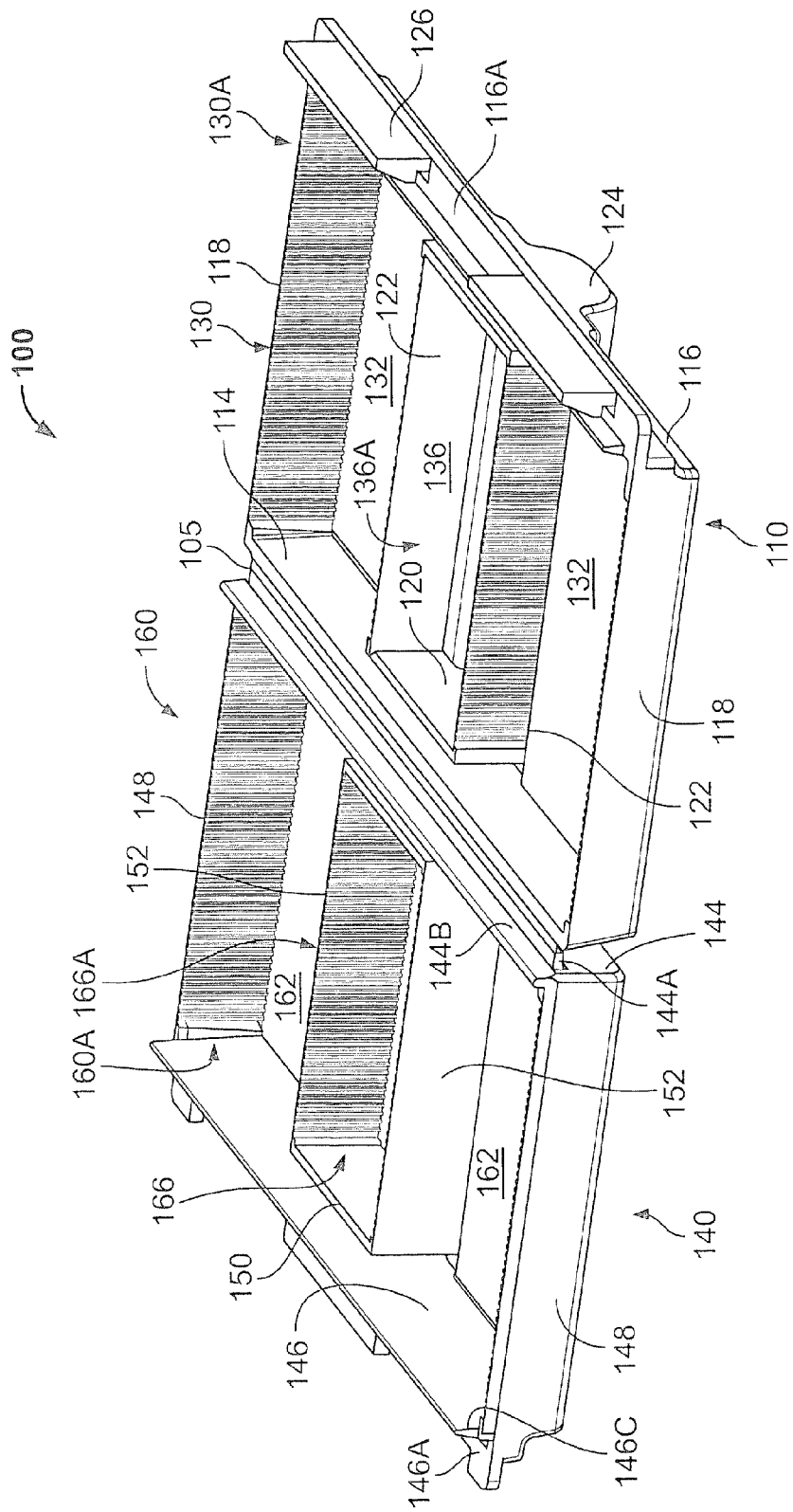
FIG. 5 is a top perspective view of a housing forming a part of the sealant-filled enclosure of FIG. 1.

Turning to the housing 100 in more detail as best seen in FIGS. 2 and 5, the cover member 110 includes a back wall 112. A hinge-side side wall 114 extends forwardly from the back wall 112. A flange 114A extends sidewardly of the wall 114 to the hinge 105. An outside side wall 116 extends forwardly from the back wall 112 along the outer edge thereof (i.e., the edge distal from the hinge 105) and opposite the wall 114. A flange 116A extends sidewardly from the wall 116. A pair of opposed end walls 118 extend forwardly from the back wall 112 and transversely across the end edges of the back wall 112. The end walls 118 may be frangible. For example, the end walls 118 may include corrugations comprising a series of fingers joined by relatively thin membranes as shown.

Figure 6:
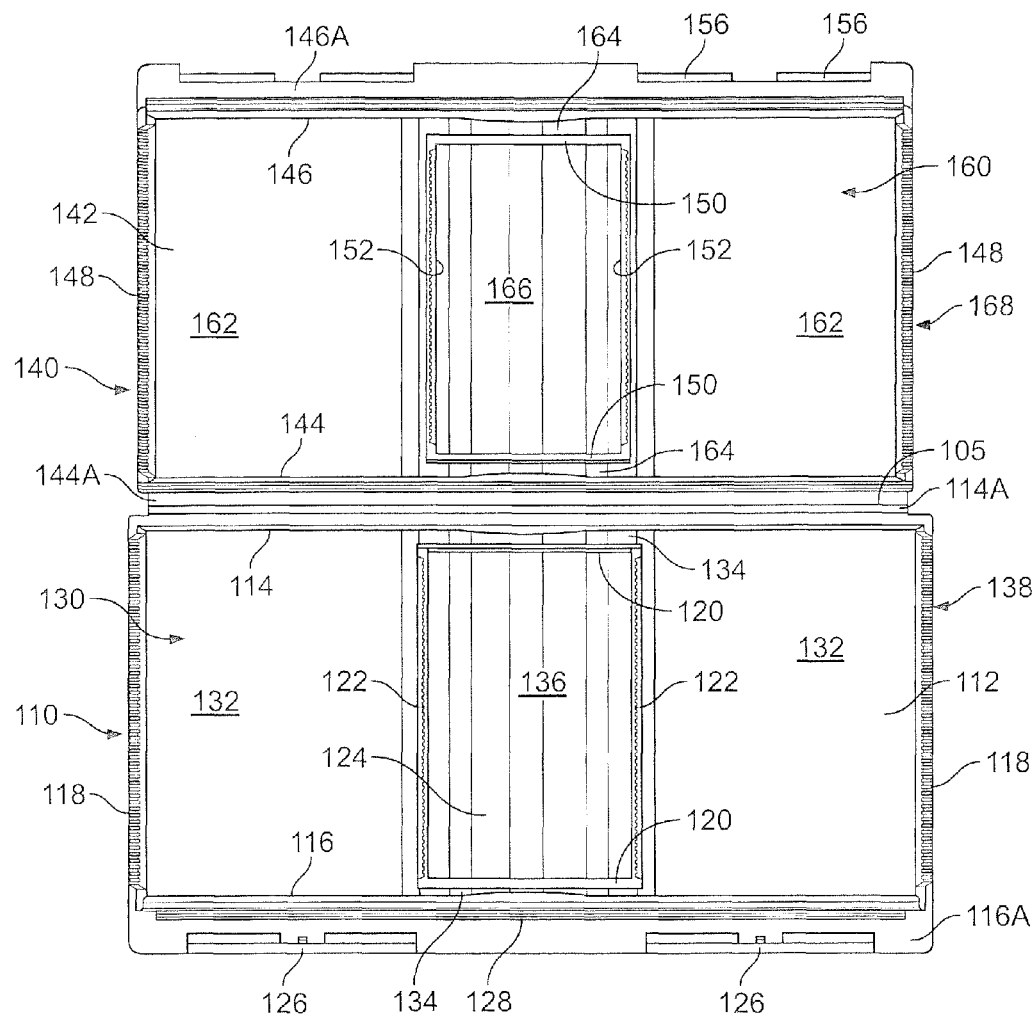
FIG. 6 is a top plan view of the housing of FIG. 5.

A pair of opposed interior side walls 120 and a pair of opposed interior end walls 122 extend forwardly from the back wall 112. The walls 122 may be frangible. For example, the walls 122 may include corrugations as best seen in FIG. 6.

A dome 124 may be defined in the back wall 112. The dome 124 includes a main dome portion and opposed step portions corresponding to the dome portions 154A and 154B (FIG. 11), respectively, as discussed below.

Figure 3:
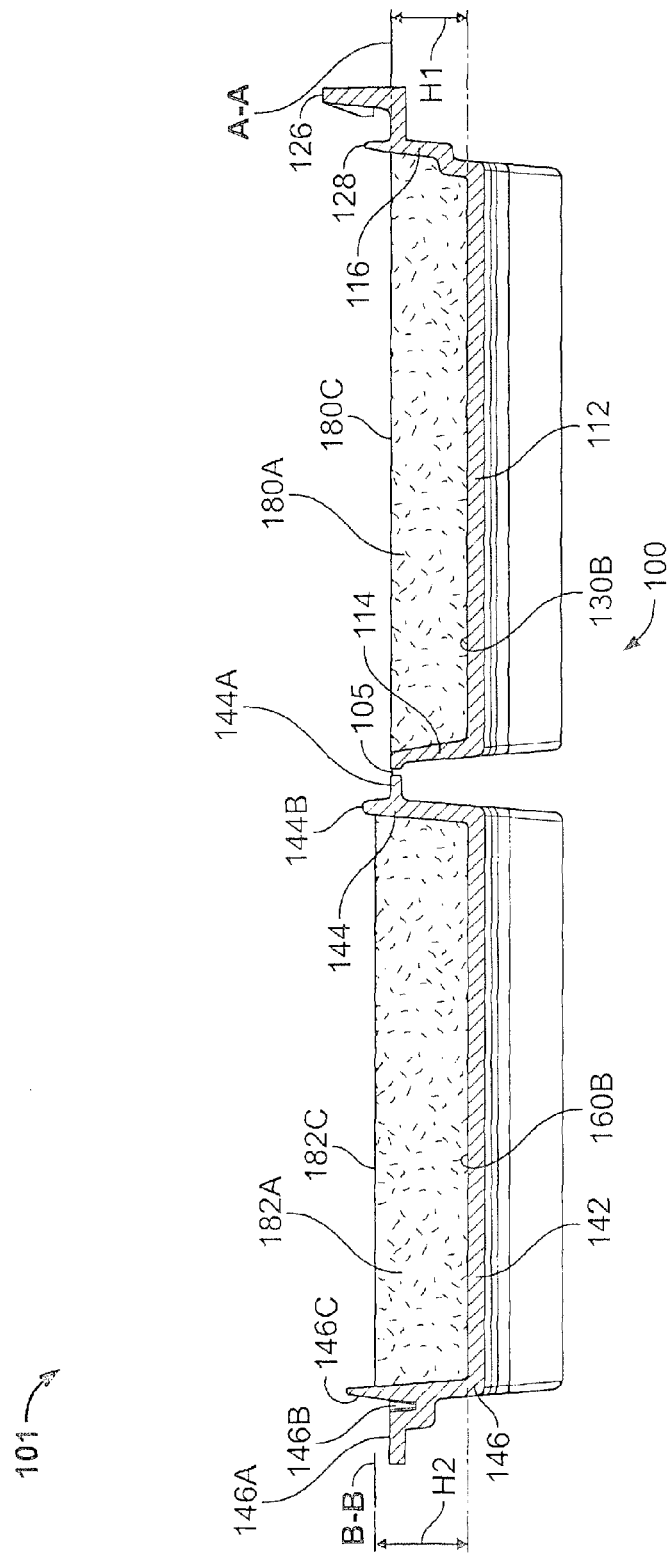
FIG. 3 is a cross-sectional view of the sealant-filled enclosure of FIG. 1 taken along the line 3-3 of FIG. 1.
Figure 9:
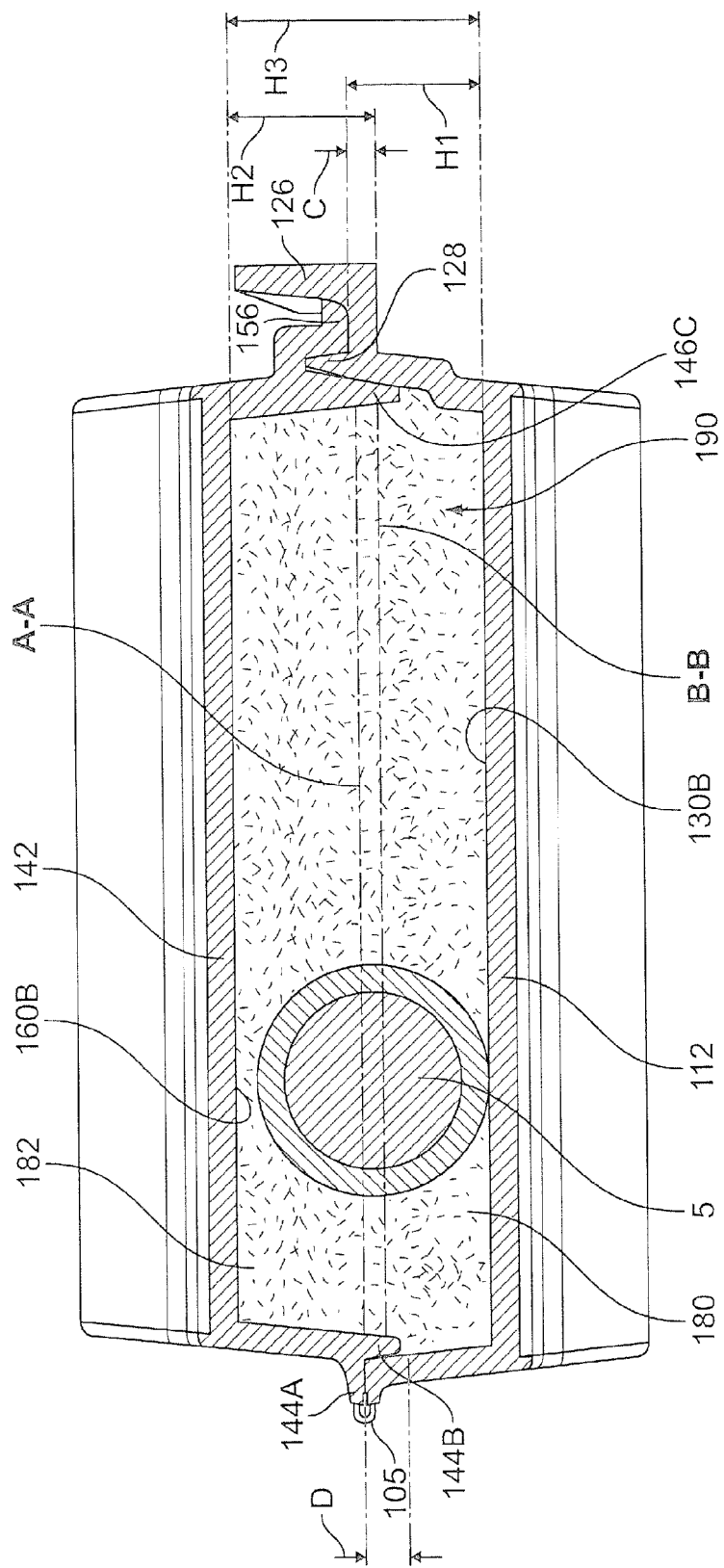
FIG. 9 is a cross-sectional view of the sealant-filled enclosure and the connection assembly of FIG. 8 taken along the line 9-9 of FIG. 8.
Figure 11:
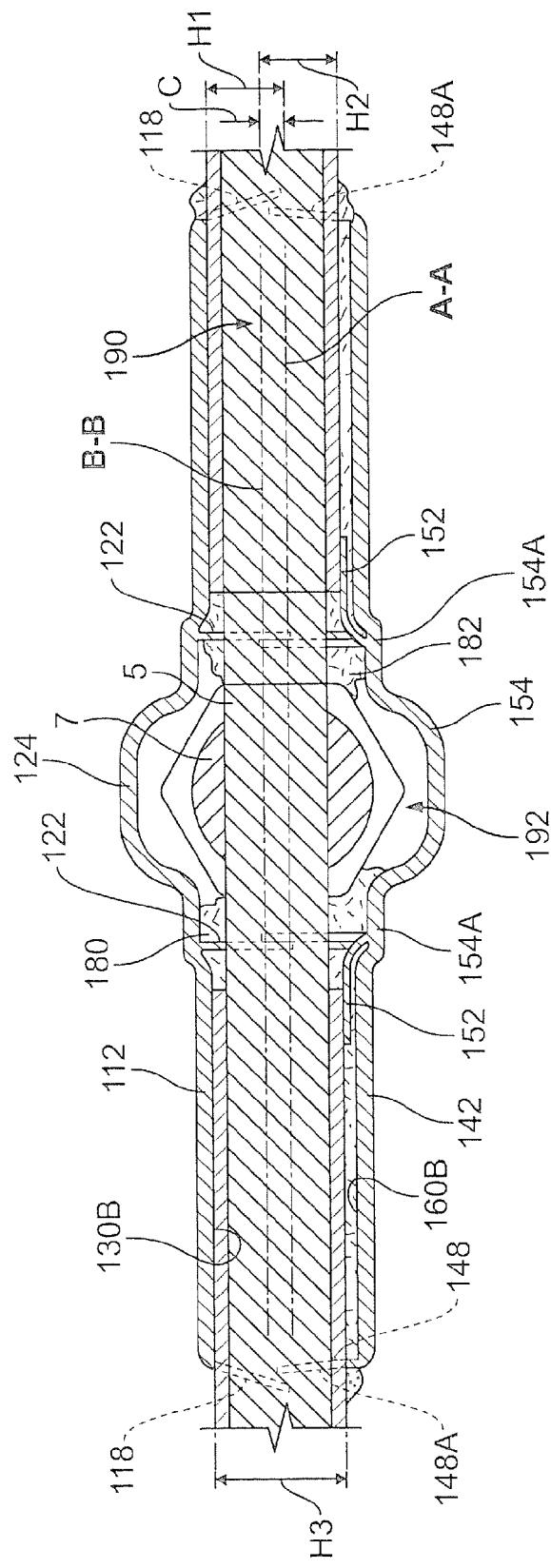
FIG. 11 is a cross-sectional view of the sealant-filled enclosure and the connection assembly of FIG. 8 taken along the line 11-11 of FIG. 8.
Figure 12:
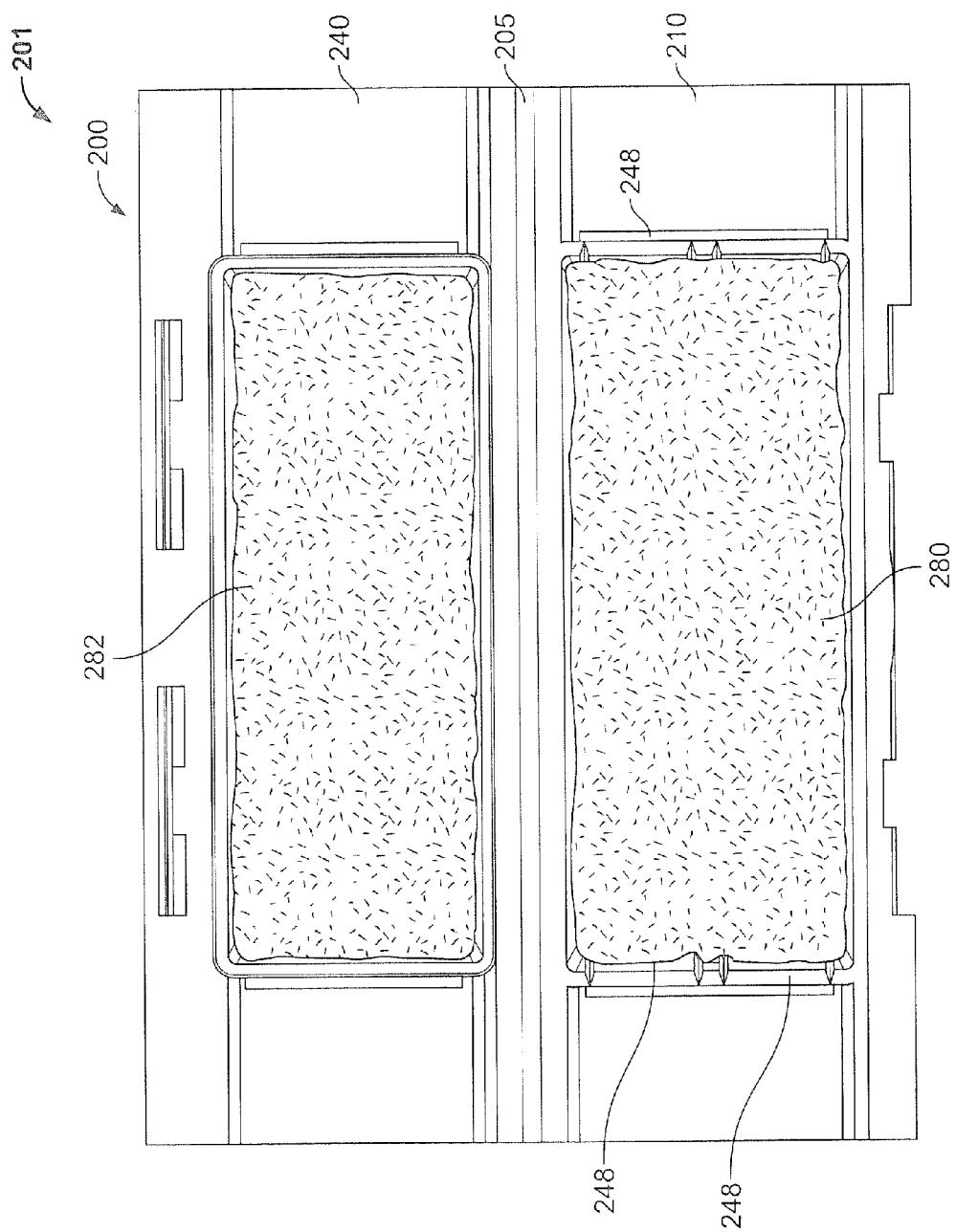
FIG. 12 is a top plan view of a sealant-filled enclosure according to further embodiments of the present invention in an open position.
Figure 13:
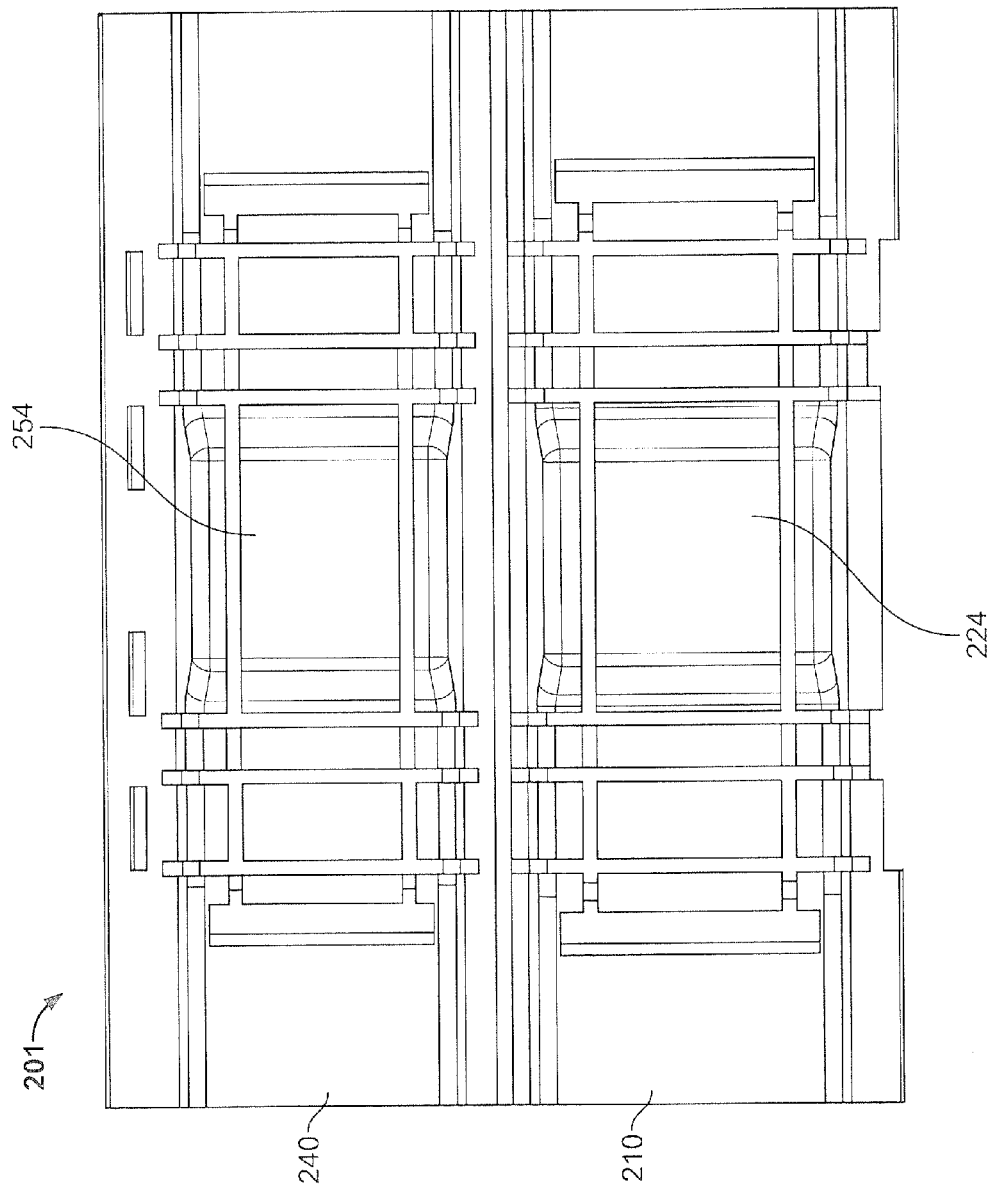
FIG. 13 is a bottom plan view of the sealant-filled enclosure of FIG. 12.

Latch members 126 and a dam wall 128 extend along the flange 116A. The walls 112, 114, 116, 118 define an overall chamber or cavity 130 and a front opening 130A communicating with the cavity 130 (FIG. 5). The cavity 130 has a bottom 130B (FIGS. 3, 9 and 11). The walls 120, 122 define an interior or void chamber 136 within the cavity 130 and a front opening 136A (FIG. 5). Between the walls 120, 122 and the walls 114, 116, 118, the cavity 130 includes front and rear chambers 132 and side chambers 134 that connect the chambers 132.

The upper, inside edges of the walls 114, 116, 118 define a surrounding interior peripheral edge 138 (FIG. 1).

The cover member 140 includes a back wall 142. An inside side wall 144 extends forwardly from the back wall 142. A flange 144A extends laterally outwardly to the hinge 105. An upstanding sealant retention wall 144B extends forwardly from and along the length of the inner edge of the wall 144. An outside side wall 146 extends forwardly from the back wall 142. A flange 146A extends laterally from the wall 146. A longitudinally extending channel 146B is defined between the wall 146 and the flange 146A. An upstanding sealant retention wall 146C extends forwardly from and along the length of the inner edge of the wall 146. A pair of opposed end walls 148 extend forwardly from the back wall 142 and transversely across the edges of the back wall 142. The end walls 148 include extension portions 148A that extend forwardly beyond the flanges 144A, 146A. The extension portions 148A may be disposed at a greater angle with respect to the back wall 142 than the remainder of the respective end walls 148.

A pair of opposed lateral interior walls 150 and a pair of opposed interior end walls 152 extend forwardly from the back wall 142. The interior end walls 152 may be frangible. For example, the walls 152 may include corrugations as best shown in FIG. 6.

As best seen in FIGS. 2 and 11, a dome 154 is defined in the back wall 142. The dome 154 includes a main dome portion 154B and opposed step portions or recesses 154A on either side of the main dome portion 154B. The shape of the interior of the dome 154 may be generally conformal to the connector 7.

Latch features 156 are formed on the flange 146A. The latch features 156 are adapted to cooperate with the latches 126 to permanently or releasably secure the enclosure 101 in the closed position.

The walls 142, 144, 146, 148 define an overall chamber or cavity 160 and a front opening 160A communicating with the cavity 160 (FIG. 5). The cavity 160 has a bottom 160B (FIGS. 3, 9 and 11). The walls 150, 152 define an interior or void chamber 166 within the cavity 160 and a front opening 166A. The chamber 166 extends outwardly beyond the back wall 142 into the dome 154. Between the walls 150, 152 and the walls 144, 146, 148, the cavity 160 includes front and rear cavity portions or chambers 162 and side cavity portions or chambers 164 that connect the chambers 162.

The upper outside edges of the walls 144B, 146C and 148A define a surrounding peripheral edge 168 (FIG. 1).

The cover members 110, 140 are pivotably joined by the hinge 105. The hinge 105 is offset from the peripheral edge 168. According to some embodiments, the hinge 105 is a flexible, living hinge. A living hinge may allow for unitary formation of the housing 100, as well as possible cost savings in materials and assembly. Alternatively, other hinge configurations may be employed. For example, the hinge 105 may be replaced by or supplemented with interlocking pivotally coupled hinge structures and/or a pivot pin, etc.

The housing 100 may be formed of any suitable material. According to some embodiments, the housing 100 is formed of an electrically insulative material. In some embodiments, the housing 100 is formed of a molded polymeric material. The housing 100 may be formed of polypropylene, flame retardant polypropylene, polyethylene and/or any suitable thermoset plastic. The housing 100 may be formed of a flame retardant material.

Figure 4:
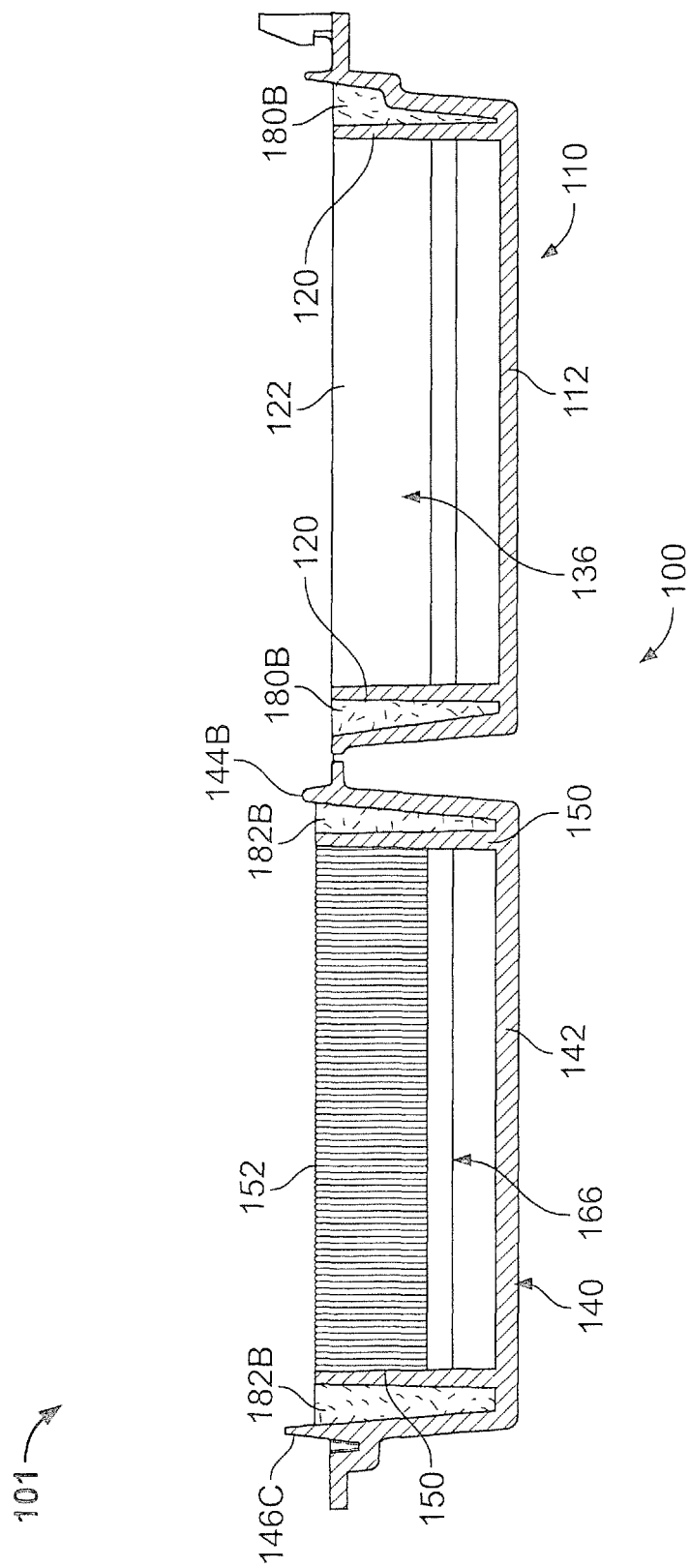
FIG. 4 is a cross-sectional view of the sealant-filled enclosure of FIG. 1 taken along the line 4-4 of FIG. 1.

Prior to use, the sealant 180 may be contained in the cavity 130 such that portions 180A of the sealant are disposed in the chambers 132 and portions 180B of the sealant are disposed in the chambers 134. According to some embodiments and as shown in FIGS. 1 and 4, the sealant 180 is not disposed in the chamber 136, or at least a portion of the volume of the chamber 136 is not filled with the sealant 180. That is, a sealant void 136B is defined in the chamber 136 and the sealant void 136B may take up the full volume of (i.e., be volumetrically coextensive with) the chamber 136. The sealant 180 fills the cavity 130 up to a level A-A (FIGS. 3, 9 and 11) that is located at a height H1 (FIGS. 3, 9 and 11) above the cavity bottom 130B. The level A-A may correspond to or be close to the top edge of the end walls 118.

Prior to use, the sealant 182 may be contained in the cavity 160 such that portions 182A of the sealant are disposed in the chambers 162 and portions 182B are disposed in the chambers 164. According to some embodiments, the sealant 182 is not disposed in the chamber 166 or at least a portion of the volume of the chamber 166 is not filled with the sealant 182. That is, a sealant void 166B is defined in the chamber 166 and the sealant void 166B may take up the full volume of (i.e., be volumetrically coextensive with) the chamber 166. The sealant 182 fills the cavity 160 up to a level B-B (FIGS. 3, 9 and 11) that is located at a height H2 (FIGS. 3, 9 and 11) above the cavity bottom 160B. The level B-B may correspond to or be close to the top edge of the end wall portions 148A.

According to some embodiments of the invention, the sealant 180, 182 is a gel. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the key definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of which are hereby incorporated herein by reference. These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis(dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 Debbaut (hereinafter "Debbaut '476") and gels based on styrene-ethylene butylenestyrene (SEBS) or styrene-ethylene propylene-styrene (SEPSS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (i.e., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer TA-XT2 commercially available from Texture Technologies Corp. of Scarsdale, N.Y., or like machines, having a five kilogram load cell to measure force, a 5 gram trigger, and ¼ inch (6.35 mm) stainless steel ball probe as described in Dubrow '300, the disclosure of which is incorporated herein by reference in its entirety. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm per sec to a penetration distance of 4.0 mm. The hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 may be analyzed on an IBM PC or like computer, running Microsystems Ltd, XT.RA Dimension Version 2.3 software.

The tack and stress relaxation are read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%$$

where $F_i$ and $F_f$ are in grams. In other words the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 120 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram. Suitable gel materials include POWERGEL sealant gel available from Tyco Electronics Energy Division of Fuquay-Varina, NC under the RAYCHEM brand.

Alternatively, the sealant 180, 182 may be a non-gel sealant. For example, the sealant 180, 182 may be silicone grease or a hydrocarbon-based grease.

The enclosure 101 may be formed in the following manner. The cover members 110, 140 and the hinge 105 may be integrally formed. According to some embodiments, the cover members 110, 140 and the hinge 105 are unitarily molded. According to some embodiments, the entirety of the housing 100 is unitarily molded. The housing 100 may be injection molded.

If the sealant 180, 182 is a material, such as a curable gel, that requires curing, the sealant may be cured in situ. According to some embodiments, the housing 100 is oriented so that the cavities 130, 160 are open upwardly as shown in FIGS. 1, 3 and 4. Liquid, uncured sealant is dispensed into the cavities 130, 160 such that it fills the chambers 132, 134, 162, 164 up to the fill levels A-A and B-B. The fill level A-A may be as high as the top edges of the extension walls 148A. The fill level B-B may be as high as the top edges of the end walls 118. The walls 112, 114, 116, 118, 142, 144, 144B, 146, 146C, 148, 148A may be sufficiently liquid impermeable to contain the uncured sealant in the cavities 130, 160 until the sealant is cured. The sealant may then be cured in situ. As will be apparent to those skilled in the art from the description herein, sealant-filled enclosures of the present invention may be formed by other methods.

Figure 7:
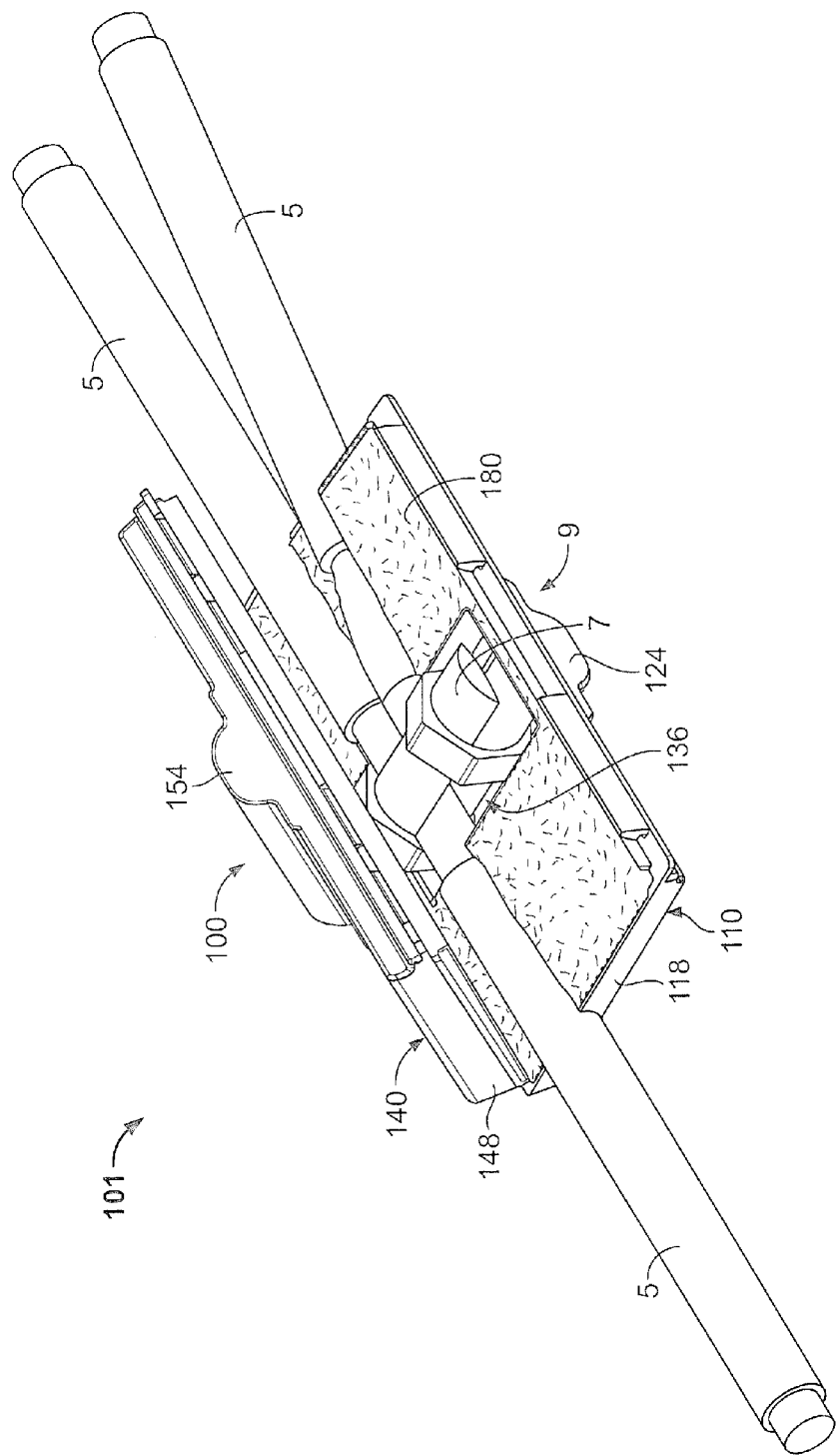
FIG. 7 is a perspective view of the sealant-filled enclosure of FIG. 1 in a partially closed position and with a connection assembly disposed therein.
Figure 8:
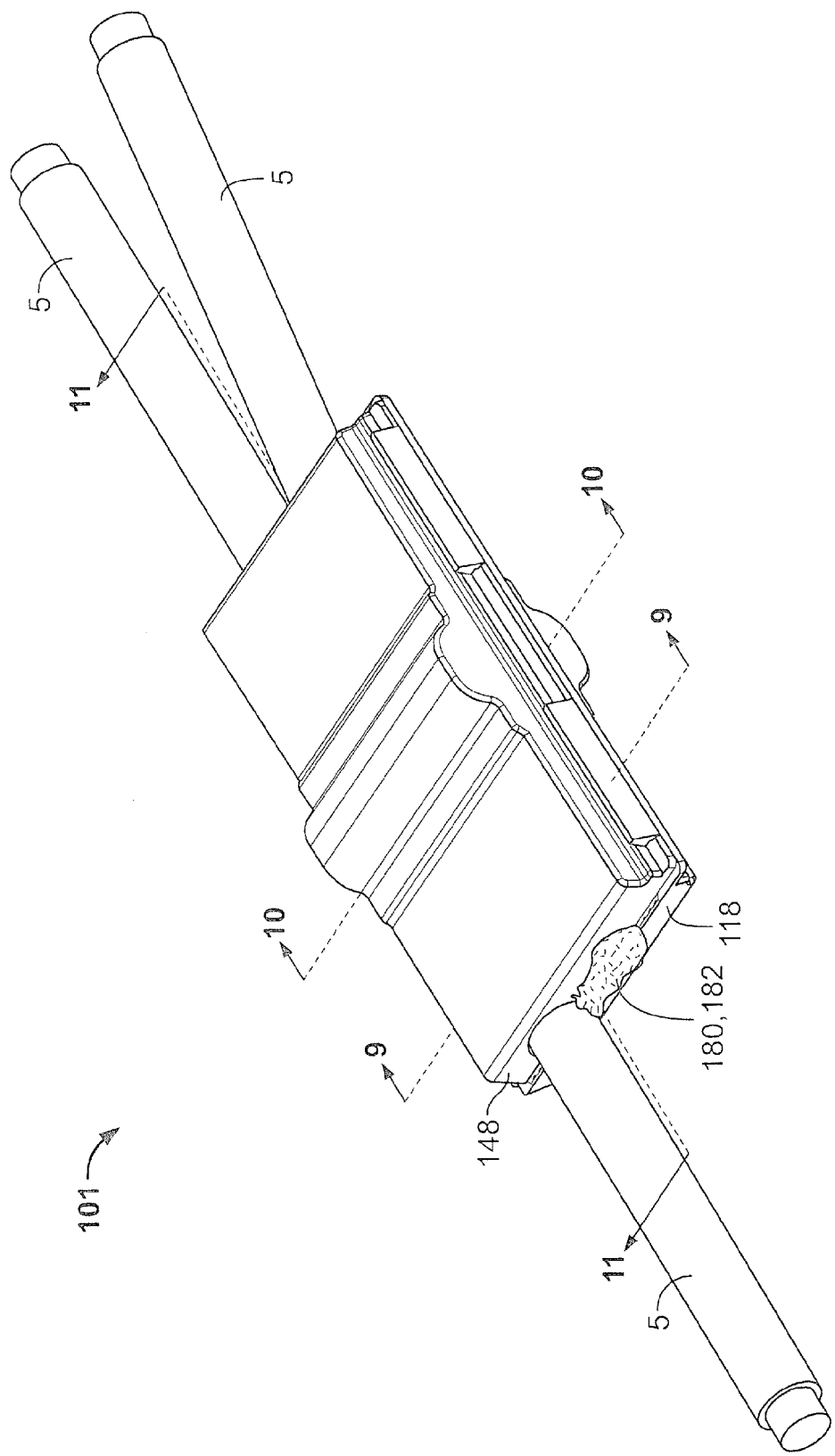
FIG. 8 is a perspective view of the sealant-filled enclosure and connection assembly of FIG. 7, wherein the sealant-filled enclosure is in a closed position.

In use, the enclosure 101 may be held in a fully or partially open position and the connection assembly 9 may be inserted between the cover members 110, 140. For example, the connection assembly 9 can first be placed in the cover member 110 (as shown in FIG. 7) or the cover member 140. The enclosure 101 may then be closed by urging the cover members 110 and 140 to pivot about the hinge 105 into engagement as shown in FIGS. 8-11, such that the latch features 126, 156 are made to lock in the closed position. According to some embodiments, a connection including the connector 7 and the adjacent portions of the cable 5 are received in the chambers 136, 166 (and, more particularly, in the voids 136B, 166B) and further portions of the cables 5 are received in the chambers 132, 162. Prior to or as the enclosure 101 is closed, the cables 5 break and splay the frangible walls 118, 148 and 122, 152 so that the cables 5 pass therethrough and are generally surrounded thereby. Because the walls 118, 148 may be angled outwardly, they tend to be splayed outwardly by the cables 5.

In the closed position of the enclosure 101, the walls 112, 114, 116, 118, 142, 144, 146, 148 of the closed housing 100 define an enclosed overall cavity or chamber 190 within which portions of the connection assembly 9 and the sealant 180, 182 are contained. The walls 120, 122, 150, 152 and chambers 136 and 166 overlap to define a chamber 192. The connector 7 and portions of the cables 5 are contained in the chamber 192.

According to some embodiments and as illustrated, when the enclosure 101 is in the closed position, a distance or height H3 (FIGS. 9 and 11) from the cavity bottom 130B to the cavity bottom 160B) is less than the sum of the heights H1 and H2 of the original sealant levels A-A and B-B (FIGS. 3, 9 and 11) by a distance C. According to some embodiments and as shown, when the enclosure 101 is in the closed position, the original fill levels A-A and B-B of the sealant masses 180 and 182 overlap as shown in FIGS. 9 and 11 the distance C. According to some embodiments, the volume of the sealant mass 180 and the volume of the sealant mass 182 together exceed the volume of the enclosure chamber 190 when the enclosure 101 is closed. As a result, as the enclosure 100 is closed, the opposed, exposed surfaces 180C, 182C of the masses of sealant 180, 182 come into contact and at least one of the sealant masses 180, 182 is displaced by the other. According to some embodiments, this will occur even if the enclosure 101 is empty (i.e., no cables 5 or connector 7 or the like are disposed between the cover members 110, 140). The sealant mass 180 and/or the sealant mass 182 may also be displaced to accommodate portions of the connection assembly 9, portions of the housing 100 and any other objects that are disposed in the chamber 190. The displaced sealant 180, 182 may be forced out of the chamber 190 through the end walls 118, 148 and/or into the chamber 192.

Figure 10:
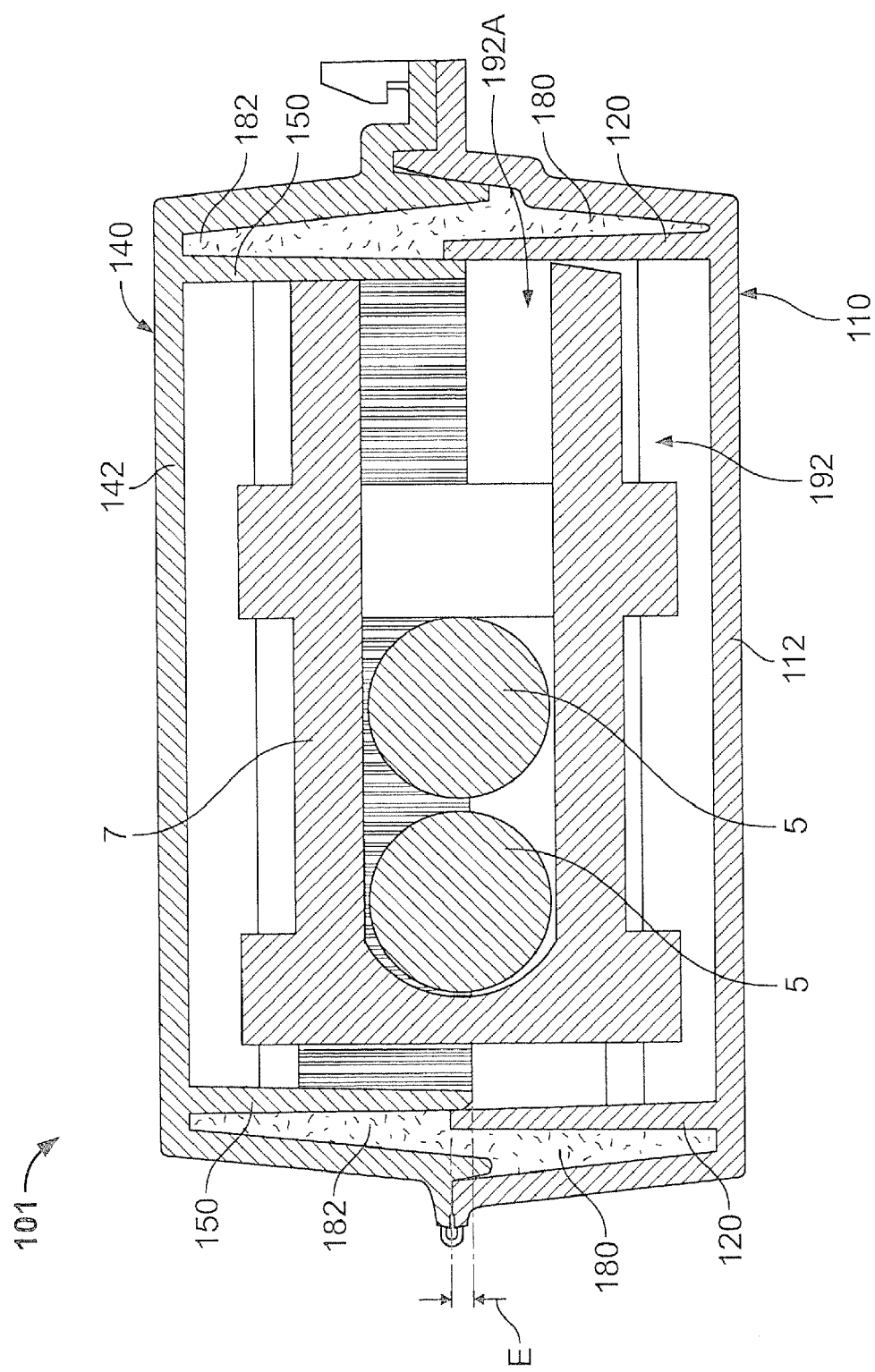
FIG. 10 is a cross-sectional view of the sealant-filled enclosure and the connection assembly of FIG. 8 taken along the line 10-10 of FIG. 8.

According to some embodiments and as best shown in FIGS. 9 and 11, when the enclosure 101 is in the closed position, an inner volume of the cavity 160 overlaps or occupies the same space or volume as an inner portion of the volume 130. More particularly, the periphery 168 of the cover member 140 is smaller than and configured to fit within the periphery 138 of the cover member 110 as shown in FIGS. 9-11 so that a portion of the cover member 140 penetrates or nests within the cover member 110. The extension walls 148A underlap the end walls 118, the extension wall 144B underlaps the side wall 114, and the extension wall 146B underlaps the side wall 116. The extended flange 144A offsets the cover member 140 to assist in properly positioning or centering the cover member 140 with respect to the cover member 110.

As noted above, the chambers 136 and 166 combine in the closed enclosure 101 to form the chamber 192. The walls 150, 152 are telescopingly received or nested in the walls 120, 122. To improve the registration between the walls 122 and 152 and reduce binding, the walls 152 may be corrugated on their inner faces and the walls 122 may be corrugated on their outer faces. The chamber 192 includes a sealant void 192A (FIG. 10) that receives portions of the connection assembly 9 (such as the relatively large connector 7) so that it may not be necessary to displace the sealant 180, 182 as the enclosure 101 is closed to accommodate these portions of the connection assembly 9. In this manner, the force required to close the enclosure 101 may be substantially reduced. This may be particularly beneficial where the sealant 180, 182 is a gel, in which case the required closure force may increase with the amount of displacement or elongation of the gel. Also, the chamber 192 may receive sealant displaced from the chambers 132, 134, 162, 164 to serve as a sealant reservoir and further reduce the required closure force.

As will be appreciated from the description herein, the sealant 180, 182 engages portions of the cables 5 to form seals thereabout. The sealant 180, 182 may also form a sealing block that surrounds the chamber 192, thereby making the chamber 192 an environmentally sealed volume. Notably, in the illustrated enclosure 101, the sealant masses 180B, 182B in the side chambers 134, 164 connect the sealant masses 180A, 182A in the chambers 132, 162 to provide a continuous and endless perimeter seal about the chamber 192 (with the exception of the interruptions caused by the cables 5). The extension wall 144B serves as a dam to inhibit the flow or migration of fluids into the chamber 190 and the flow or migration of the sealant 180, 182 out of the chamber 190 on the hinge side. The extension wall 146C and the wall 128 similarly cooperate to inhibit ingress and egress of fluids and sealant on the latch side.

The enclosure 101 may provide a number of advantages. The enclosure 101 may provide a reliable (and, in at least some embodiments, moisture-tight) seal about the connection assembly 9. The sealant 180, 182, particularly gel sealant, may accommodate cables of different sizes within a prescribed range. The interfacing and "overlapping" sealant masses 180, 182 may ensure that a suitable seal is provided by and between the sealant masses even if the size of the connection assembly 9 positioned in the enclosure 101 is very small, or even if no cable and/or connector is positioned in the enclosure 101 to displace the sealant.

The void 192A of the chamber 192 also allows the enclosure 101 to accommodate a wide range of sizes of connection assemblies 9 while reducing the compression force required to close the enclosure 101. This may be particularly advantageous in the case of relatively large connection assemblies 9 which might otherwise necessitate a high level of compression force in order to displace and, thereby, elongate a large mass of gel. The overlapping configuration of the sealant masses 180, 182 can provide an effective seal about very small diameter cables to extend the use range of the enclosure 101.

When the sealant 180, 182 is a gel, the cables 5 and the housing 100 may apply a compressive force to the sealant 180, 182 as the enclosure 101 is transitioned from the open position to the closed position. The gel may thereby be elongated and be generally deformed and substantially conform to the outer surfaces of the cables 5 and to the inner surface of the housing 100. Some shearing of the gel may occur as well. At least some of the gel deformation may be elastic. The restoring force in the gel resulting from this elastic deformation generally causes the gel to operate as a spring exerting an outward force between the housing 100 and the cables 5.

According to some embodiments, the enclosure 101 is adapted such that, when the connection assembly 9 is installed, the gel has an elongation or compressive volume or overlap at the interface between the gel 180, 182 and the inner surface of the housing 100 of at least 2%.

Various properties of the gel as described above may ensure that the gel sealant 180, 182 maintains a reliable and long lasting hermetic seal between the housing 100 and the cables 5. The elastic memory of and the retained or restoring force in the elongated, elastically deformed gel generally cause the gel to bear against the mating surfaces of the cables 5 and the interior surface of the housing 100. Also, the tack of the gel may provide adhesion between the gel and these surfaces. The gel, even though it is cold-applied, is generally able to flow about the cables 5 and the housing 100 to accommodate their irregular geometries.

According to some embodiments, the sealant 180, 182 is a self-healing or self-amalgamating gel. This characteristic, combined with the aforementioned compressive force between the cables 5 and the housing 100, may allow the sealant 180, 182 to re-form into a continuous body if the gel is sheared by the insertion of the cables 5 into the enclosure 101. The gel may also re-form if the cables 5 are withdrawn from the gel.

The sealant 180, 182, particularly when formed of a gel as described herein, may provide a reliable moisture barrier for the cables 5 and the connector 7, even when the enclosure 101 is submerged or subjected to extreme temperatures and temperature changes. The housing 100 may be made from an abrasion resistant material that resists being punctured by the abrasive forces.

The gel may also serve to reduce or prevent fire. The gel is typically a more efficient thermal conductor than air and, thereby, may conduct more heat from the connection. In this manner, the gel may reduce the tendency for overheating of the connection assembly 9 that might otherwise tend to deteriorate the cable insulation and cause thermal runaway and ensuing electrical arcing at the connection. Moreover, the gel may be flame retardant.

According to some embodiments, the heights H1 and H2 (FIGS. 3, 9 and 11) of the sealant levels A-A and B-B are each at least about 0.1 inch. According to some embodiments, the heights H1 and H2 are each between about 0.1 and 2 inches. According to some embodiments, the distance C (FIGS. 9 and 11) is at least about 0.05 inch. According to some other embodiments, the distance C is between about 0.05 and 0.25 inch. According to some embodiments, the extension walls 148A underlap the end walls 118 substantially the same distance as the distance C. According to some embodiments, the extension wall 144B extends a distance D (FIG. 9) of at least 0.05 inch into the cavity 130. According to some other embodiments, the distance D is between about 0.05 and 0.25 inch.

According to some embodiments, the overlapping volume between the sealant masses 180, 182 when the enclosure 101 is closed without any cables, connectors, etc., positioned in the enclosure 101 (i.e., the volume in the distance C) is at least 1 cc. According to some embodiments, the overlapping volume is between about 5 cc and 100 cc. According to some embodiments, the sealant masses 180, 182 are gel and are elongated at least 2% when the sealant-filled enclosure is closed while empty. According to some embodiments, the elongation is between about 2 and 40%.

According to some embodiments, the distance E (FIG. 10) that the walls 120, 122 overlap the walls 150, 152 is at least about 0.05 inch. According to some embodiments, the distance E is between about 0.05 and 0.2 inch.

According to some embodiments, the volume of the chamber 192 is at least about 30 cc. According to some embodiments, the volume is between about 30 cc and 200 cc. According to some embodiments, the chamber 192 is substantially devoid of sealant so that the volume of the void 192A therein is in the aforementioned ranges.

With reference to FIG. 11, the step portions 154A of the dome 154 and the corresponding steps of the dome 124 provide space for the bend radius of the end walls 122, 152 so that the effective height for receiving the cable between the cover members 110, 140 is increased. The depths of the step portions may be selected to provide a height at least as great as the nominal height between the back walls 112, 142 so that the permissible cable diameter is not limited by the walls 122, 152.

As will be appreciated from the description herein, enclosures according to the present invention may be provided as pre-formed and fully assembled units, with pre-cured gel or other sealant therein as described above, that may be cold applied about a connection assembly to form an environmental seal.

While, in accordance with some embodiments, the housing 100 is integrally and unitarily formed, the housing may be otherwise formed in accordance with some aspects of invention. For example, the cover members 110, 140 and/or the hinge 105 may be separate parts joined together in hinged fashion or otherwise. According to some embodiments, the cover members 110, 140 are not hinged, but are instead provided as two separate members that are secured together by latch structures, ties, clamps or other suitable means.

The frangible walls 118, 122, 148, 148A, 152 may be constructed as described in U.S. Pat. No. 5,763,863 to Huynh-Ba, et al., the disclosure of which is incorporated herein by reference. Additionally or alternatively, these walls may be formed with pre-formed holes for receiving a cable or cables (in which case supplemental means may be provided for retaining uncured sealant in the cavities 130, 160 during manufacture.

It will be appreciated that enclosures in accordance with the present invention may have components (e.g., cover members, walls, etc.) and cavities or chambers having shapes, configurations and/or sizes different than those shown and described herein.

Various aspects and features as described herein may be modified or omitted in accordance with further embodiments of the present invention. For example, the walls 120, 122, 150, 152, the chambers 136, 166 and the voids 136B, 166B may be omitted and the cavities 130, 160 may be filled with sealant. According to still further embodiments, the walls 120, 122, 150, 152 may be omitted with the voids 136B, 166B being formed and defined by other means.

Figure 14:
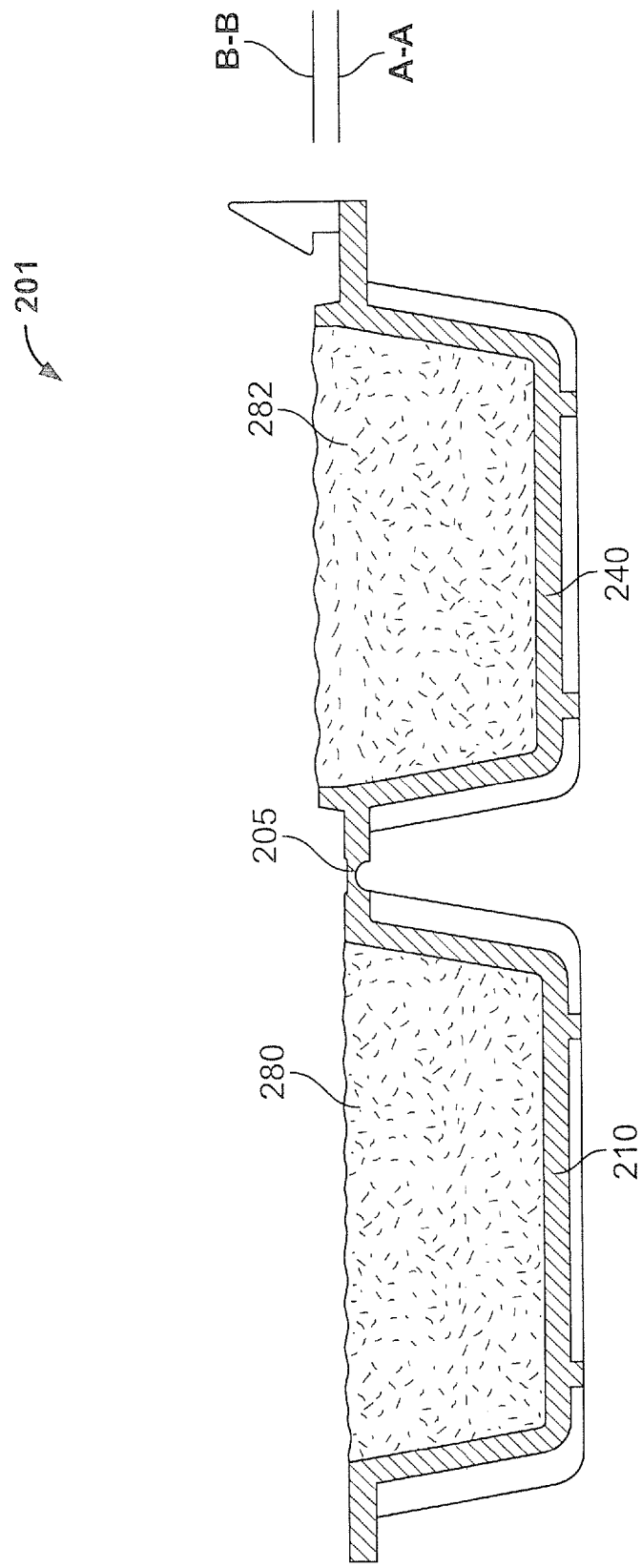
FIG. 14 is a cross-sectional view of the sealant-filled enclosure of FIG. 12 taken along the line 14-14 of FIG. 12.
Figure 15:
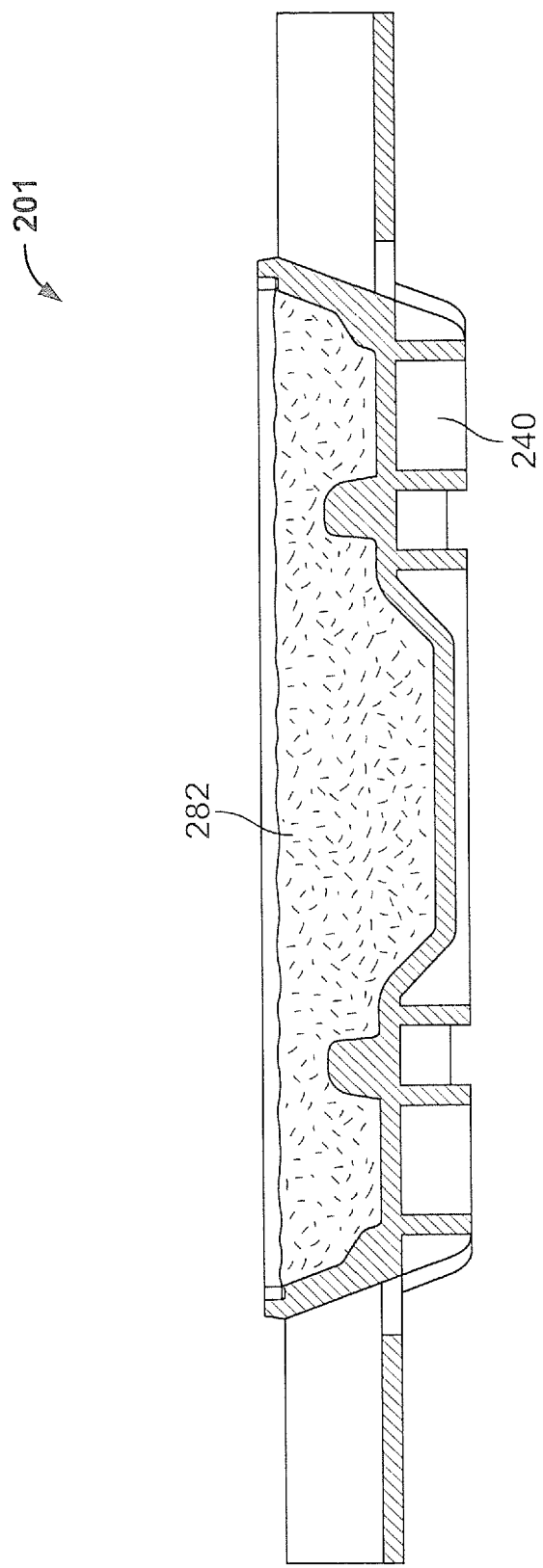
FIG. 15 is a cross-sectional view of the sealant-filled enclosure of FIG. 12 taken along the line 15-15 of FIG. 12.
Figure 16:
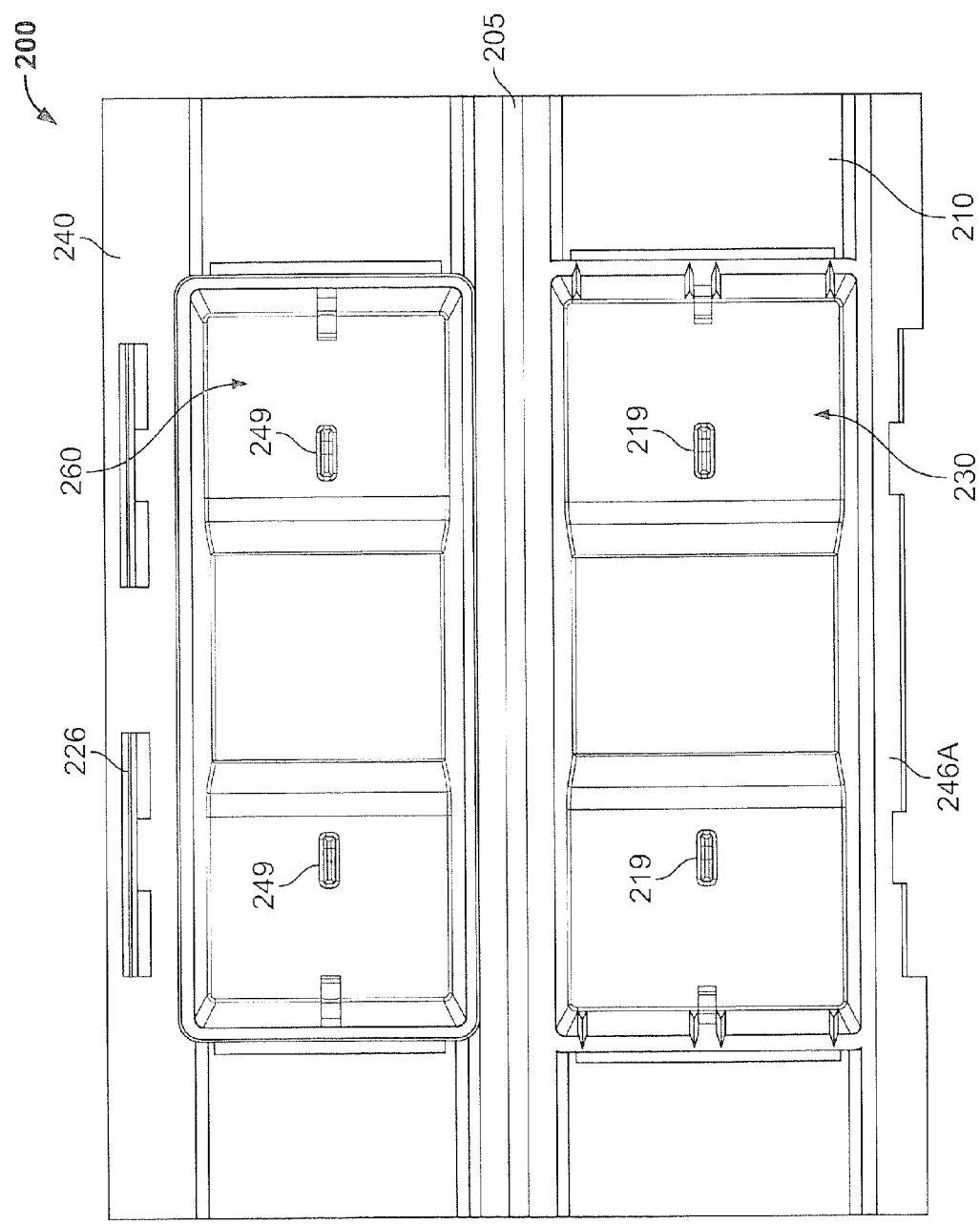
FIG. 16 is a top plan view of a housing forming a part of the sealant-filled enclosure of FIG. 12.

With reference to FIGS. 12-15, a sealant-filled enclosure 201 according to further embodiments of the present invention is shown therein. The enclosure 201 may be constructed and used in substantially the same or similar manner as the enclosure 101. The enclosure 201 includes a housing 200 having cover members 210, 240 foldable about a hinge 205. Latch features 226, 246 are provided on the cover members 210, 240. The cover members 210 and 240 define respective cavities 230 and 260 (FIG. 16) filled with sealant masses 280 and 282, respectively. Domes 224, 254 may be provided in the cover members 210, 240 to receive a connector. The cover member 210 has breakaway or deflectable end walls 248 to permit passage of cables. Posts 219, 249 (FIG. 16) may be provided to secure the connector or splice in the enclosure 201. As shown in FIG. 14, the sealant levels A-A and B-B are provided and the housing 200 is configured such that the sealant masses 280 and 282 overlap as discussed above with regard to the sealant masses 180 and 182. The enclosure 201 differs from the enclosure 101 in that there is no pre-formed void in the cover members 210, 240 or the sealant masses 280, 282 corresponding to the voids 136B, 166B.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A sealant-filled enclosure for environmentally sealing a connection, the enclosure comprising:
    a first cover member defining a first cavity having a first bottom;
    a second cover member pivotally connected to the first cover member along a hinge side for movement between an open position and a closed position wherein the enclosure defines an enclosure cavity having an enclosure volume, the second cover member defining a second cavity having a second bottom;
    a first sealant positioned in the first cavity and extending up to a first level at a first height relative to the first bottom without a connection disposed in the first cavity; and
    a second sealant positioned in the second cavity and extending up to a second level at a second height relative to the second bottom without a connection disposed in the second cavity, wherein the first and second heights together exceed an enclosure height from the first bottom to the second bottom in the closed position;
    wherein the second cover member includes a first upstanding sealant retention wall extending forwardly from the second sealant and longitudinally along the hinge side;
    wherein the second cover member includes a second upstanding sealant retention wall extending forwardly from the second sealant and longitudinally along a side opposite the hinge side; and
    wherein, when the first and second members are pivoted about the hinge side from the open position to the closed position, the first upstanding sealant retention wall and the second retention wall each serve as a dam to inhibit flow of the first and/or second sealants out of the enclosure cavity.

2. The enclosure of claim 1 wherein the first and second sealants are gels.

3. The enclosure of claim 2 wherein the first and second sealants are adapted to be elongated and elastically deformed in the closed position.

4. The enclosure of claim 1 configured such that the first sealant will displace the second sealant as the enclosure is closed without a connection disposed therein.

5. The enclosure of claim 1 wherein:
    in the open position without a connection disposed in the first and second cavities, the first sealant fills a first sealant volume and the second sealant fills a second sealant volume; and
    the first and second sealant volumes together exceed the enclosure volume.

6. The enclosure of claim 1 wherein, in the open position without a connection disposed in the first and second cavities, the first sealant fills a first sealant volume and the second sealant fills a second sealant volume, and, in the closed position, the first and second sealant volumes overlap.

7. The enclosure of claim 6 wherein the first sealant volume is disposed within the first cavity and the second sealant volume is disposed within the second cavity.

8. The enclosure of claim 6 wherein, in the closed position, the first and second sealant volumes overlap by a volume of at least 1 cc.

9. The enclosure of claim 1 wherein, in the closed position, at least a portion of the second cover member defining the second cavity extends into the first cavity.

10. The enclosure of claim 1 including at least one interior wall defining a void chamber within the first cavity, wherein the void chamber is adapted to receive a portion of the connection and at least a portion of the void chamber is not filled with sealant.

11. The enclosure of claim 10 wherein the at least one interior wall includes a frangible wall.

12. The enclosure of claim 10 wherein:
the first cover member includes a back wall having a recess defined therein; and
the at least one interior wall is joined to the back wall in the recess.

13. The enclosure of claim 10 wherein the void chamber extends outwardly beyond the bottom of at least one of the first and second cavities.

14. The enclosure of claim 1 including at least one frangible wall defining the first cavity.

15. The enclosure of claim 1 wherein the first and second cover members are formed of a polymeric material.

16. The enclosure of claim 1 including a hinge pivotally connecting the first and second cover members, and the wherein the first and second cover members and the hinge are integrally formed.

17. The enclosure of claim 16 wherein the first and second cover members and the hinge are integrally and unitarily molded.

18. A method for environmentally protecting a connection, the method comprising:
providing a sealant-filled enclosure including:
a first cover member defining a first cavity having a first bottom;
a second cover member pivotally connected to the first cover member along a hinge side for movement between an open position and a closed position wherein the enclosure defines an enclosure cavity having an enclosure volume, the second cover member defining a second cavity having a second bottom;
a first sealant positioned in the first cavity and extending up to a first level at a first height relative to the first bottom without a connection disposed in the first cavity;
a second sealant positioned in the second cavity and extending up to a second level at a second height relative to the second bottom without a connection disposed in the second cavity, wherein the first and second heights together exceed an enclosure height from the first bottom to the second bottom in the closed position;
inserting a connection assembly between the first and second cover members; and
relatively pivoting the second cover member about the first cover member from the open position to the closed position with the connection assembly therebetween;
wherein the second cover member includes a first upstanding sealant retention wall extending forwardly from the second sealant and longitudinally along the hinge side;
wherein the second cover member includes a second upstanding sealant retention wall extending forwardly from the second sealant and longitudinally along a side opposite the hinge side; and
wherein, when the first and second members are pivoted about the hinge side from the open position to the closed position, the first upstanding sealant retention wall and the second retention wall each serve as a dam to inhibit flow of the first and/or second sealants out of the enclosure cavity.

19. The method of claim 18 wherein the first and second sealants are gels.

20. A sealant-filled enclosure for environmentally sealing a connection, the enclosure comprising:
a first cover member defining a first cavity and including at least one first interior wall defining a first void chamber within the first cavity, the first cover member further defining a first sealant chamber in the first cavity outside of the void chamber, wherein the first void chamber is adapted to receive a portion of the connection, wherein at least a portion of the first void chamber is not filled with sealant;
a second cover member pivotally connected to the first cover member for movement between an open position and a closed position, the second cover member defining a second cavity and including at least one second interior wall defining a second void chamber within the second cavity, the second cover member further defining a second sealant chamber in the second cavity outside of the void chamber, wherein the second void chamber is adapted to receive a portion of the connection, wherein at least a portion of the second void chamber is not filled with sealant;
a first sealant disposed in the first sealant chamber and fully circumscribing the first void chamber; and
a second sealant disposed in the second sealant chamber and fully circumscribing the second void chamber;
wherein, in the closed position, the first and second void chambers combine to form a sealed void chamber and the first and second sealants engage one another and combine to form a sealant block that surrounds the sealed void chamber; and
wherein in the open position without a connection disposed in the enclosure, the first sealant extends up to a first level at a first height relative to a first bottom of the first sealing chamber, and the second sealant extends up to a second level at a second height relative to a second bottom of second sealant chamber; and
the first and second heights together exceed an enclosure height from the first bottom to the second bottom in the closed position.

21. A sealant-filled enclosure for environmentally sealing a connection, the enclosure comprising:
a first cover member defining a first cavity and including at least one first interior wall defining a first void chamber within the first cavity, the first cover member further defining a first sealant chamber in the first cavity outside of the void chamber, wherein the first void chamber is adapted to receive a portion of the connection, wherein at least a portion of the first void chamber is not filled with sealant;

a second cover member pivotally connected to the first cover member for movement between an open position and a closed position, the second cover member defining a second cavity and including at least one second interior wall defining a second void chamber within the second cavity, the second cover member further defining a second sealant chamber in the second cavity outside of the void chamber, wherein the second void chamber is adapted to receive a portion of the connection, wherein at least a portion of the second void chamber is not filled with sealant;

a first sealant disposed in the first sealant chamber and fully circumscribing the first void chamber; and a second sealant disposed in the second sealant chamber and fully circumscribing the second void chamber;

wherein, in the closed position, the first and second void chambers combine to form a sealed void chamber and the first and second sealants engage one another and combine to form a sealant block that surrounds the sealed void chamber; and wherein the enclosure is configured such that the first sealant will displace the second sealant as the enclosure is closed without a connection disposed in the enclosure.

* * * * *